United States Patent [19]

Ulam

[11] Patent Number: 4,646,935
[45] Date of Patent: Mar. 3, 1987

[54] INDUCTION COOKING UTENSILS

[75] Inventor: John B. Ulam, McMurray, Pa.

[73] Assignee: Clad Metals, Inc., Canonsburg, Pa.

[21] Appl. No.: 692,731

[22] Filed: Jan. 18, 1985

[51] Int. Cl.$^4$ ............................................. H05B 1/02
[52] U.S. Cl. ................................ 220/453; 219/10.77;
219/10.79; 428/653
[58] Field of Search .................... 220/453, 468, 83;
99/DIG. 14; 426/241, 243, 244, 245, 246, 247;
428/653, 683, 685, 926, 928; 219/10.49 R,
10.79, 10.77

[56] References Cited

U.S. PATENT DOCUMENTS

| | | | |
|---|---|---|---|
| 3,445,630 | 5/1969 | Ulam | 219/438 |
| 3,788,513 | 1/1974 | Racz | 220/64 |
| 3,909,591 | 9/1975 | Ulam | 219/438 |
| 3,919,763 | 11/1975 | Ulam | 29/460 |
| 3,930,806 | 1/1976 | Racz | 428/653 |
| 3,941,569 | 3/1976 | Sasame et al. | 428/653 |
| 3,966,426 | 6/1976 | McCoy et al. | 219/10.79 X |
| 4,246,045 | 1/1981 | Ulam | 428/653 X |
| 4,354,082 | 10/1982 | Tellert et al. | 219/10.77 X |

Primary Examiner—Steven M. Pollard
Attorney, Agent, or Firm—Beveridge, DeGrandi & Weilacher

[57] ABSTRACT

A cooking utensil for use with an induction range has a first layer including a magnetic metal which is capable of being inductively heated, and a second layer which includes a ply of aluminum and a ply of copper, this second layer being in intimate thermally conducting contact with the first layer and being located interiorly of the utensil with respect to the first layer. The first layer may have a ply of carbon steel located between two plies of stainless steel.

A disclosed utensil has its bottom and side walls formed of a first layer with an inner ply of inductively heatable magnetic material, and an outer ply of copper or stainless steel; a second layer with a thermally conductive aluminum or copper ply which lies in direct contact with the magnetic material; and, a stainless steel layer at the interior of the utensil. A stainless steel ring encloses the perimetral edge of the utensil wall.

To deter corrosion of the carbon steel at the edge of the utensil, the circumferential edge of the utensil has a stainless steel ring which encloses a metal which, in the galvanic series, is sacrificial with respect to the carbon steel.

27 Claims, 9 Drawing Figures

INDUCTION COOKING UTENSILS

BACKGROUND OF THE INVENTION

This invention relates to cooking vessels which are capable of being inductively heated when placed in an oscillating magnetic field. Inductive heating principles are well-known and are described for example in U.S. Pat. Nos. 3,966,426 and 4,354,082, the contents of which are incorporated into this specification by reference.

The patent literature mentioned in the preceding paragraph discloses many different arrangements of metallic plies which may form the walls of cooking vessels intended for use with induction ranges. This invention is believed to represent certain improvements to the prior art and to provide cooking utensils which are durable, attractive, possess good thermal conductivity through their thicknesses, and also provide good lateral heat transmission in order to avoid or reduce the presence of hot spots in the utensils. According to one feature of the invention, the tendency toward corrosion of carbon steel which is exposed at the edge of the vessel is reduced or avoided.

SUMMARY OF THE INVENTION

One feature of this invention involves a cooking utensil formed of multiple plies of different metals which are in intimate thermally conducting contact with each other, and wherein a first layer has at least a portion thereof formed of an inductively heatable magnetic metal, and a second layer is located interiorly of the utensil with respect to the first layer, the second layer including a ply of aluminum and a ply of copper.

Preferably, a cooking utensil constructed according to the preceding paragraph may have a number of additional features such as the following: a layer of stainless steel is located interiorly of the utensil with respect to the second layer; the second layer has the ply of copper located between two plies of aluminum; the first layer has two plies of nonmagnetic stainless steel located on opposite sides of a ply of carbon steel; the plies of aluminum each have a core formed of aluminum alloy which is clad on its opposite sides with pure aluminum; the first layer has an exterior ply of stainless steel; the first layer is formed of magnetic stainless steel; or, the first layer may include a ply of carbon steel in which event the utensil has a stainless steel ring as is described hereinbelow to deter corrosion of the carbon steel.

From another perspective, the invention involves a cooking utensil in which a first layer is formed of a ply of carbon steel located between two plies of stainless steel, and the second layer includes at least one ply of copper which is located interiorly of the vessel with respect to the first layer. The first layer is capable of being inductively heated by placement in a magnetic field, and the second layer has a higher thermal conductivity than the first layer. In connection with this aspect of the invention, the utensil preferably also has a third layer formed of stainless steel which is located interiorly of the utensil with respect to the second layer. The copper preferably is a core of the second layer, and it is clad on its opposite sides with two plies of aluminum. Each of the aluminum plies may itself have a core formed of aluminum alloy which is clad on its opposite sides with pure aluminum. A corrosion deterring stainless steel ring may also be provided as is described in the subsequent paragraph.

Another feature of the invention is that a cooking utensil has its bottom and side walls formed of a material which has a first layer which includes an outer ply of copper or stainless steel and an inner ply of an inductively heatable magnetic material. A second layer has a thermally conductive aluminum or copper ply which lies in direct contact with the ply of magnetic material. The utensil may have a stainless steel interior, and it may also have a stainless steel ring which encloses the perimetral edge of the utensil wall.

The invention also involves a cooking utensil wherein a stainless steel ring on a utensil wall encloses a metal which in the galvanic series is sacrificial with respect to a carbon steel ply in the utensil wall to deter corrosion of the carbon steel at the edge of the utensil.

Several examples illustrating the diverse applicabilities of the invention are provided in the following drawings and detailed description.

DETAILED DESCRIPTION

Figure 1:
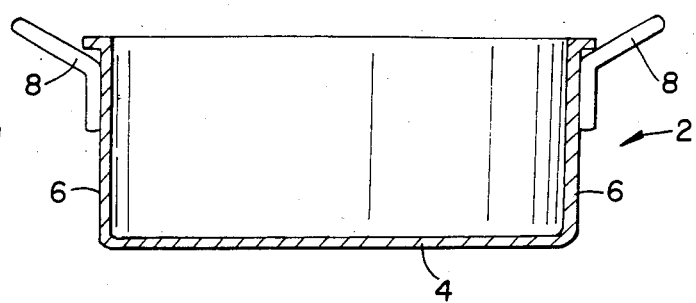
FIG. 1 is a side view of a typical utensil constructed according to the invention.

FIG. 1 is a sectional view of a cooking utensil 2 constructed according to the invention. It preferably has a horizontal bottom wall 4, upstanding side walls 6, and one or more handles 8. The vessel may be formed from a single blank of metal which has a plurality of plies roll bonded together using processes of the type disclosed in earlier U.S. patents of the present inventor, and in the references listed in these earlier patents. The utensil may be formed by drawing, hydroforming, or by other processes known in the art. The utensils may take various forms including the illustrated pot, skillets, pans, griddles or other items.

For convenience of identification in this specification, the plies in the outer inductively-heatable layers of the utensils have reference numerals starting with the number "2", and the plies in the layer with higher thermal conductivity are identified by reference numerals which start with the number "3."

Figure 2:
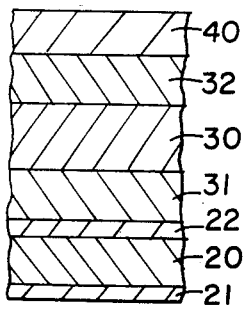
FIG. 2 is an enlarged sectional view showing the wall of the vessel according to a first embodiment of the invention.

The utensil wall shown in FIG. 2 has its outer layer formed of a ply 20 of carbon steel clad on its opposite sides with plies 21 and 22 of nonmagnetic stainless steel. By way of example, the carbon steel may be 1005 to 1010 steel and the stainless steel may be in the 200 or 300 series. A suitable composite metal comprising the plies 20, 21 and 22 is commercially available. The principal heat conducting layer has a copper ply 30 located between two plies 31 and 32 of aluminum. Additionally, there is an interior layer 40 of stainless steel.

With respect to the thicknesses of the metal in FIG. 2, each ply 21 and 22 has a thickness which is about ten to twenty percent of the total thickness of the plies 20, 21 and 22, this total thickness being about 0.015 to 0.050 inch. The plies 30, 31 and 32 have a total thickness of about 0.020 to 0.080 inch of which about 0.010 to 0.030 inch is formed of the copper core 30, and the balance of which is equally occupied by the aluminum claddings 31 and 32. The interior stainless steel ply 40 has a thickness of about 0.005 to 0.025 inch.

Figure 3:
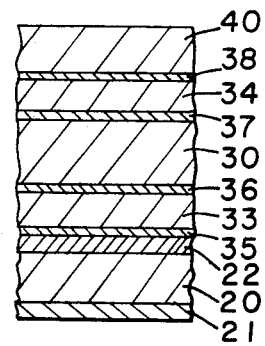
FIG. 3 is an enlarged sectional view showing the wall of the vessel according to a second embodiment of the invention.

In FIG. 3, the plies 20, 21, 22, 30 and 40 are essentially the same as in FIG. 2; however, the aluminum plies are somewhat different. Rather than having a uniform composition throughout their thicknesses as in FIG. 2, the aluminum plies in FIG. 3 each have aluminum alloy cores 33 and 34 which are clad on their opposite sides with pure aluminum as shown at 35, 36, 37 and 38. A clad aluminum material of this type is commercially available and is sold under the trademark ALCLAD by Aluminum Company of America, Pittsburgh, Pa.

Figure 4:
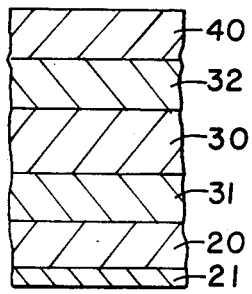
FIG. 4 is an enlarged sectional view showing the wall of the vessel according to a third embodiment of the invention.

The wall structure shown in FIG. 4 is identical to the structure shown in FIG. 2, except that the stainless steel ply 22 has been omitted.

Figure 5:
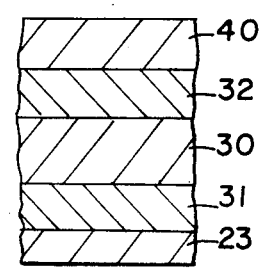
FIG. 5 is an enlarged sectional view showing the wall of the vessel according to a fourth embodiment of the invention.

Referring to FIG. 5, the outermost layer is formed of a single ply 23 of a ferromagnetic stainless steel. Materials of this nature are well known, and a preferred form thereof is 430 stainless steel. The layers 30, 31, 32 and 40 in FIG. 5 correspond to the plies which are identified by the same reference numerals in FIGS. 2 and 4.

Figure 6:
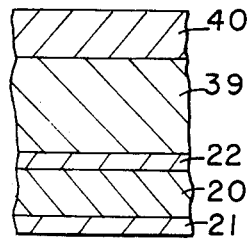
FIG. 6. is an enlarged sectional view showing the wall of the vessel according to a fifth embodiment of the invention.

In the embodiment of FIG. 6, the outer and inner layers of the cooking utensil are identical to the corresponding layers shown in FIGS. 2 and 3, the plies of these layers being identified by the reference numerals 20, 21, 22 and 40. However, in FIG. 5, the intermediate thermally conductive layer is formed of a single ply 39 of copper which preferably has a thickness of about 0.015 to 0.050 inch.

A potential problem in cookware which has one or more plies of carbon steel is that of corrosion at the exposed edges of the metal. Prior to this invention, there has been carbon steel cookware which is protected from corrosion by coatings of enamel and a stainless steel edge ring. However, to the knowledge of the present inventor, no one has addressed the specific problem of edge corrosion which is raised by utensil walls which have multiple plies as described above.

Figure 7:
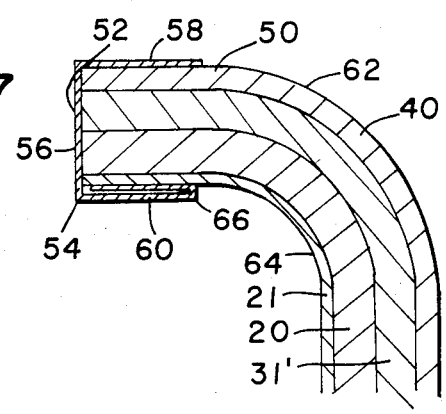
FIG. 7 is an enlarged sectional view showing the edge of a utensil constructed according to the invention, and provided with a ring which deters corrosion of the carbon steel at the edge of the utensil.

According to one aspect of this invention, the potential problem of edge corrosion is avoided by the arrangement shown in FIG. 7. The wall of the vessel has an outer ply 21' of stainless steel or copper, a ply 20 of carbon steel, a ply 31' of aluminum or copper, and an inner ply 40 of stainless steel. Some advantages of the invention will be realized if the wall in FIG. 7 has the structures shown in FIGS. 2-6.

The upper portion of the vessel wall in FIG. 7 is turned outwardly to form an annular horizontal flange 50 with an edge 52 to which all four plies 20, 21', 31' and 40 extend. A stainless steel edge ring 54 is located at the outer edge and this edge ring 54 has a U-shaped cross section formed by a base 56 which overlies the vessel edge 52 and a pair of flanges 58 and 60 which respectively overlie the interior surface 62 and the exterior surface 64 of the vessel. The upper flange 58 is formed of a single thickness of stainless steel, and the lower flange 60 is bent inwardly upon itself at 66 to form a double thickness of stainless steel. A single thickness lower flange is also possible. In most instances, the ring will be circular to correspond to the circular perimeter of conventional cooking vessels, and the ring will initially have a radial split which permits its placement around the utensil perimeter. After the ring is so placed on the utensil, the ends thereof adjacent to the split will be welded together to hold the ring to the vessel in the position shown in FIG. 7.

The ring 54 in the present invention encloses the edge of the utensil wall to deter corrosion. When the ply 31' is aluminum, the ring 54 causes galvanic current between the ply 31' and the carbon steel ply 20 to remain within the confines of the ring 54. Aluminum is higher in the galvanic series than carbon steel so, in utensil walls where the aluminum is in contact with the carbon steel, the presence of the ring 54 will cause the aluminum to act as a sacrificial material which deters the corrosion of the carbon steel at the edge of the utensil wall.

Figure 8:
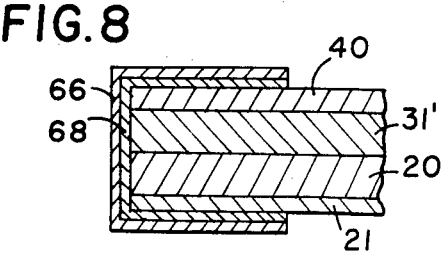
FIGS. 8 and 9 are enlarged sectional views showing two arrangements wherein corrosion of carbon steel at the edge of a utensil is deterred by locating a sacrificial metal between a perimetral ring and the edge of a utensil.
Figure 9:
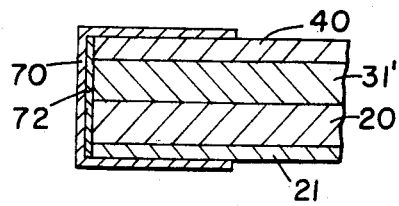

FIGS. 8 and 9 show other forms of edge rings which tend to prevent corrosion of the carbon steel in the utensil wall. In FIG. 8, the ring 66 has an interior layer 68 of a material which is sacrificial in the galvanic series with respect to the carbon steel. The layer 68 may be aluminum, in which event the ring 66 may be formed of commercially available stainless clad aluminum. The layer 68 may also be zinc or tin, applied to the stainless steel ring by any of the known commercial coating processes for these metals.

FIG. 9 shows a ring 70 which holds a sacrificial metal 72 in electrical contact with the edge of the utensil wall. The metal 72 may be tin, zinc or aluminum, applied by dipping the utensil edge in a molten bath of the sacrificial metal before the stainless steel ring is applied. Alternatively, the metal 72 may be applied mechanically by placing a small wire of the metal inside the ring, and then flattening the wire when rolling the ring around the perimeter of the utensil.

Persons familiar with the field of the invention will realize that there are numerous ways in which the utensils according to the invention may be designed and manufactured. For example, an exterior ply of copper may be used over or in lieu of the stainless steel 21; or, the interior layer 40 of stainless steel may be omitted. Accordingly, it is emphasized that the invention is not limited solely to the disclosed embodiments, but is embracing of a wide variety of utensils which although not specifically shown or described herein, are embraced within the spirit of the following claims.

I claim:

1. A cooking utensil having a wall formed of a plurality of layers of metal, each of said layers being formed of one or more plies of metal, said layers and any plies therewithin being in intimate thermally conducting contact with each other,
   a first said layer having at least a portion thereof formed of a magnetic metal which is capable of being inductively heated by placement in a magnetic field,
   a second said layer located interiorly of the utensil with respect to the first layer, said second layer being in intimate thermally conducting contact with the first layer and having a higher thermal conductivity than said first layer, said second layer including a ply of aluminum and a ply of copper, said wall having an edge to which said magnetic metal extends, said wall also having interior and exterior surfaces, a stainless steel ring covering said edge around the circumference of the cooking utensil, said stainless steel ring enclosing a metal which in the galvanic series is sacrificial with respect to the magnetic metal, said sacrificial metal being in electrical contact with the magnetic metal to deter corrosion of the magnetic metal at said edge.

2. A cooking utensil according to claim 1 wherein said wall has a layer of stainless steel located interiorly of the utensil with respect to the second layer.

3. A cooking utensil according to claim 1 wherein said wall has a layer of stainless steel located interiorly of the utensil with respect to the second layer, said second layer having two plies of aluminum and one ply of copper, said ply of copper being located between said two plies of aluminum, said first layer having a ply of carbon steel and two plies of nonmagnetic stainless steel, said plies of nonmagnetic stainless steel being located on opposite sides of said ply of carbon steel.

4. A cooking utensil according to claim 3 wherein each of said plies of aluminum has a core formed of aluminum alloy which is clad on its opposite sides with pure aluminum.

5. A cooking utensil according to claim 1 wherein the second layer has two plies of aluminum and one ply of copper, said ply of copper being located between said two plies of aluminum.

6. A cooking utensil according to claim 1 wherein the ply of aluminum in said second layer has a core formed of aluminum alloy which is clad on its opposite sides with pure aluminum.

7. A cooking utensil according to claim 1 wherein said second layer has two plies of aluminum and one ply of copper, said ply of copper being located between said two plies of aluminum, each of said plies of aluminum having a core formed of aluminum alloy which is clad on its opposite sides with pure aluminum.

8. A cooking utensil according to claim 1 wherein said first layer has an exterior ply of stainless steel.

9. A cooking utensil according to claim 8 wherein said first layer is formed of magnetic stainless steel.

10. A cooking utensil according to claim 8 wherein said first layer is formed of a ply of carbon steel and a ply of nonmagnetic stainless steel, said ply of nonmagnetic stainless steel being located exteriorly of the utensil with respect to said ply of carbon steel.

11. A cooking utensil according to claim 10 wherein said first layer has a second ply of nonmagnetic stainless steel, said plies of nonmagnetic stainless steel being located on opposite sides of said ply of carbon steel.

12. A cooking utensil according to claim 1 wherein said
   stainless steel ring has a U-shaped cross section with a base which overlies said edge and with a pair of flanges which overlie said interior and exterior surfaces of the utensil adjacent to said edge.

13. A cooking utensil having a wall formed of a plurality of layers of metal, each of said layers being formed of one or more plies of metal, said layers and any plies within said layers being in intimate thermally conducting contact with each other, a first said layer including two plies of stainless steel and a ply of magnetic metal, said ply of magnetic metal being located between said plies of stainless steel, said ply of magnetic metal being capable of being inductively heated by placement in a magnetic field, a second said layer including at least one ply of copper, said second layer being located interiorly of the utensil with respect to the first layer and being in intimate thermally conducting contact with the frist layer, said second layer having a higher thermal conductivity than said first layer, said wall having interior and exterior surfaces, a stainless steel ring covering said edge around the circumference of the cooking utensil, said stainless steel ring enclosing a metal which in the galvanic series is sacrificial with respect to the magnetic metal, said sacrificial metal being in electrical contact with the magnetic metal to deter corrosion of the magnetic metal at said edge.

14. A cooking utensil according to claim 13 including a third layer formed of stainless steel and located interiorly of the utensil with respect to the second layer.

15. A cooking utensil according to claim 13 wherein the second layer has two plies of aluminum located on opposite sides of said ply of copper.

16. A cooking utensil according to claim 15 wherein each of said plies of aluminum has a core formed of aluminum alloy which is clad on its opposite sides with pure aluminum.

17. A cooking utensil according to claim 13 including a third layer formed of stainless steel and located interiorly of the utensil with respect to the second layer,
   said second layer has two plies of aluminum located on opposite sides of said ply of copper.

18. A cooking utensil according to claim 17 wherein each of said plies of aluminum has a core formed of aluminum alloy which is clad on its opposite sides with pure aluminum.

19. A cooking utensil according to claim 13, wherein said
   stainless steel ring has a U-shaped cross section with a base which overlies said edge and with a pair of flanges which overlie said interior and exterior surfaces of the utensil adjacent to said edge.

20. A cooking utensil having a wall with an exterior surface and an interior surface, said wall having a ply of carbon steel located between the exterior surface and the interior surface, said wall having an edge to which the ply of carbon steel extends, and a stainless steel ring covering said edge around the circumference of the cooking utensil, said stainless steel ring having a U-shaped cross section with a base which overlies said edge and with a pair of flanges which overlie said interior and exterior surfaces of the utensil adjacent to said edge, said stainless steel ring enclosing a metal which in the galvanic series is sacrificial with respect to the carbon steel, said sacrificial metal being in electrical contact with the carbon steel to deter corrosion of the carbon steel at said edge.

21. A cooking utensil according to claim 20 wherein the wall also has a ply of copper therein.

22. A cooking utensil according to claim 20 wherein the sacrificial metal is a ply of aluminum in the wall of the utensil.

23. A cooking utensil according to claim 20 wherein the sacrificial metal is located between the stainless steel ring and the edge of the utensil.

24. A cooking utensil having a wall which forms the bottom and sidewalls of the utensil, said wall being formed of a plurality of layers of metal, each of said layers being formed of one or more plies of metal, said layers and any plies therewithin being in intimate thermally conducting contact with each other and extening throughout the bottom and sidewalls of the vessel, a first said layer having an outer ply selected from the group consisting of stainless steel and copper, said first layer also having a ply of a magnetic metal which is capable of being inductively heated by placement in a magnetic field, a second said layer located interiorly of the utensil with respect to the first layer, said second layer being in intimate thermally conducting contact with the first layer and having a higher thermal conductivity than said first layer, said second layer including a ply selected from the group consisting of aluminum and copper which is in direct contact with said magnetic metal, said wall having an edge to which said magnetic metal extends, said wall also having interior and exterior surfaces, a stainless steel ring covering said edge around the circumference of the cooking utensil, said stainless steel ring enclosing a metal which in the galvanic series is sacrificial with respect to the magnetic metal, said sacrificial metal being in electrical contact with the magnetic metal to deter corrosion of the magnetic metal at said edge.

25. A cooking utensil according to claim 24 wherein the wall has a layer of stainless steel located interiorly of the utensil with respect to the second layer.

26. A cooking utensil according to claim 23 wherein the sacrificial metal is a layer of metal which is clad on the interior surface of the stainless steel ring.

27. A cooking utensil according to claim 26 wherein the sacrificial metal is aluminum.

* * * * *